UNITED STATES PATENT OFFICE.

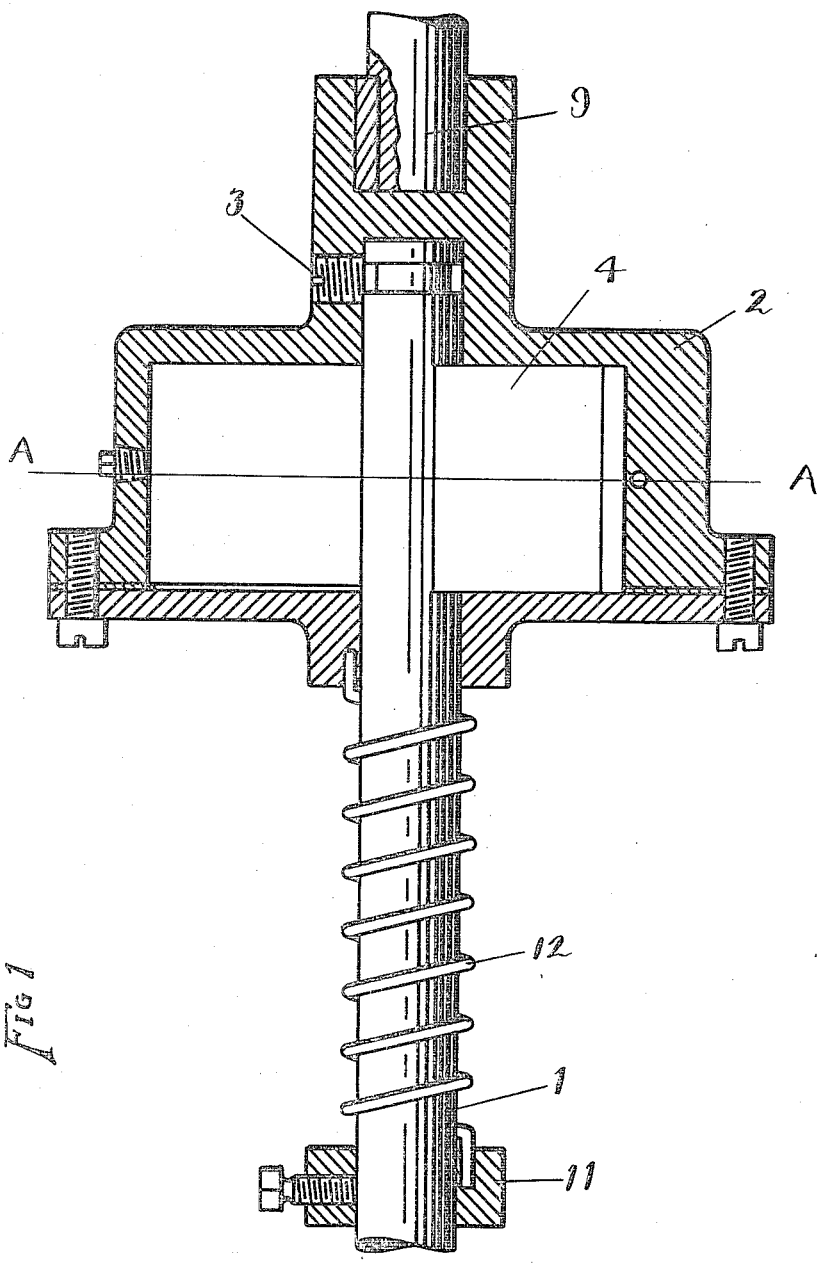

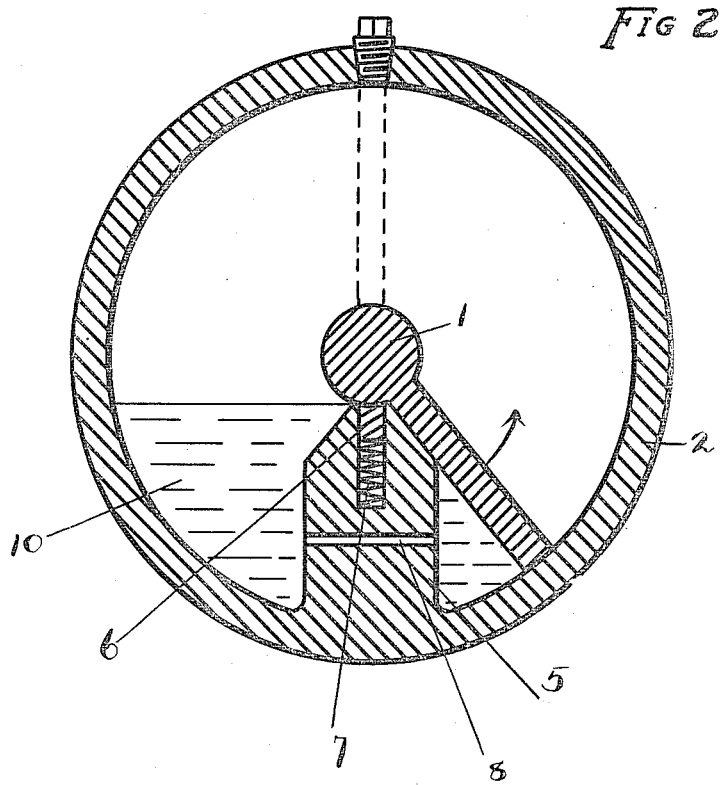

RICHARD T. COOKE, OF INDIANAPOLIS, INDIANA.

POWER-TRANSMITTING MECHANISM.

1,296,769.  Specification of Letters Patent.  Patented Mar. 11, 1919.

Application filed October 5, 1918. Serial No. 257,081.

*To all whom it may concern:*

Be it known that I, RICHARD T. COOKE, a citizen of the United States, residing at Indianapolis, in the county of Marion and State of Indiana, have invented a certain new and useful Improvement in Power-Transmitting Mechanism, of which the following is a specification.

The object of my invention is to provide a cushioning means between the driver and driven member of any power transmission train and the invention is especially adapted for automobile service. The invention consists in the following combination and arrangement of parts as hereinafter described and claimed.

By experience I have found that a large amount of the excessive wear and breakage in power transmission appliances even where friction clutches are used, is caused by a too sudden connection between the driving element and the driven element. I have therefore shown in the accompanying drawings my invention wherein Figure 1 is a longitudinal section and Fig. 2 a cross section on line A A.

The numeral 1, represents the shaft ordinarily connected with the driving unit by means of a friction clutch.

The numeral 2 represents an oil tight receptacle mounted to rotate on the free end of shaft 1.

The shoulder screw 3 prevents shaft 1 from pulling out of the oil tight receptacle.

The numeral 4 represents a paddle or flange rigidly connected with shaft 1 and a snug fit in receptacle 2.

The numeral 5 represents a dam which divides the oil receptacle and in order to provide a tight joint where this dam meets the shaft, I mount a shoe 6 in the upper end of said dam which is held in contact with the shaft by means of the spring 7.

A small hole 8 is drilled through dam 5, the purpose of which will be hereinafter described.

The numeral 9 represents the shaft which connects with the driven element of any unit.

The receptacle 2 is partially filled with a viscous substance 10. In operation this device is mounted anywhere between the driving and driven element. When the power is thrown on, shaft 1 rotates and brings the paddle 4 around in the direction indicated by the arrow. This paddle strikes the viscous liquid 10 which retards its action as the liquid is forced through the hole 8 into the other side of the chamber. This cushions the load between the driving and driven element and picks it up slowly until paddle 4 strikes the opposite side of dam 5.

In order to provide means for bringing paddle 4 back into a neutral position as shown in the dotted lines I mount a collar 11 on shaft 1 which carries a spring 12 connecting with oil receptacle 2. This also provides for operation of the device in either direction as the viscous liquid will seek a level when at rest.

I claim:

1. In the transmission device the combination of a driving shaft, a driven shaft, a receptacle carried by said driven shaft, a viscous liquid in said receptacle, a paddle rigidly mounted on said driving shaft, a dam dividing said receptacle into two compartments and a connection between said compartments whereby the liquid can be driven from one to the other by the action of the paddle substantially as and for the purpose set forth.

2. In a power transmitting device, the combination of a driving shaft, a driven shaft, a receptacle mounted thereon, a paddle rigidly mounted on a driving shaft and adapted to fit snugly in the receptacle on the driven shaft, a dam dividing the said receptacle into two compartments, a movable friction plug mounted in said dam and bearing against said driving shaft, a communication through said dam connecting the two compartments formed thereby, a viscous liquid in said receptacle adapted to be driven from one compartment to the other by means of the paddle substantially as and for the purpose set forth.

RICHARD T. COOKE.

Witnesses:
 BESS WIARS,
 M. H. FULLER.